United States Patent [19]

Braniff et al.

[11] 4,065,182
[45] Dec. 27, 1977

[54] CUSHION RETENTION FOR A VEHICLE SEAT

[75] Inventors: Michael J. Braniff, Troy; James L. Waller, Sterling Heights, both of Mich.

[73] Assignee: General Motors Corporation, Detroit, Mich.

[21] Appl. No.: 718,881

[22] Filed: Aug. 30, 1976

[51] Int. Cl.² .............................................. A47C 7/02
[52] U.S. Cl. .................................. 297/452; 5/353.1; 297/455; 297/460
[58] Field of Search ........................... 5/353.1–353.8; 297/218, 219, 226, 452, 455, 456, 458–460, DIG. 1, DIG. 2

[56] References Cited

U.S. PATENT DOCUMENTS

| | | | |
|---|---|---|---|
| 1,368,397 | 2/1921 | Hussander | 297/455 |
| 1,962,215 | 6/1934 | Sallup | 297/226 X |
| 2,096,822 | 10/1937 | Oldham | 5/353.1 |
| 2,101,124 | 12/1937 | Young | 5/353.1 |
| 2,117,748 | 5/1938 | Stewart | 5/353.6 |
| 2,120,036 | 6/1938 | Northup | 297/226 X |
| 2,203,007 | 6/1940 | Bartel et al. | 5/353.1 |
| 3,411,820 | 11/1968 | Brett et al. | 296/63 |
| 3,411,824 | 11/1968 | White et al. | 297/452 |
| 3,628,830 | 12/1971 | Mitjans | 297/452 |
| 3,747,178 | 7/1973 | Harder | 5/353.6 X |

Primary Examiner—James C. Mitchell
Attorney, Agent, or Firm—Charles E. Leahy

[57] ABSTRACT

The supporting members of a vehicle seat includes a molded plastic seat bottom support member and a molded plastic seat back support member. Cushion members for mounting on the support members include a cushion bun of resilient foam and a seat cover for enveloping the cushion bun. The seat cover has an opening in the underside thereof which permits insertion of the cushion bun when the cushion bun is compressed. A resilient retainer wire extends around the opening and is attached to the edges of the seat cover by J-shaped plastic hook strips so that the resilience of the foam bun exerts tension of the retainer wire. The retainer wire has a plurality of abutment structures integral therewith and adapted for mating engagement with corresponding abutments provided on the seat support members when the cushion member is forcibly stressed to flex the retainer wire. Termination of the stressing effort applied to the cushion member allows the resilience of the retainer wire and the tension applied to the seat cover by the compressed cushion bun to maintain the engagement of the retainer wire abutments with the abutments of the support member.

3 Claims, 5 Drawing Figures

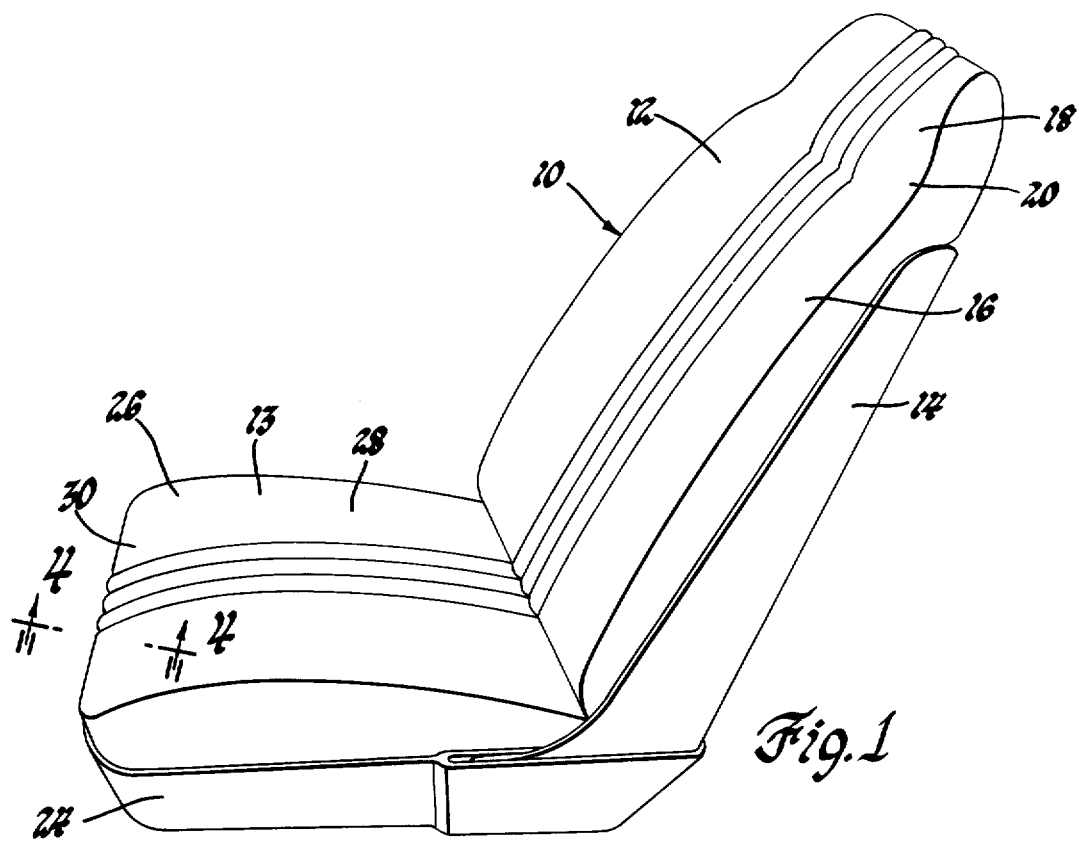
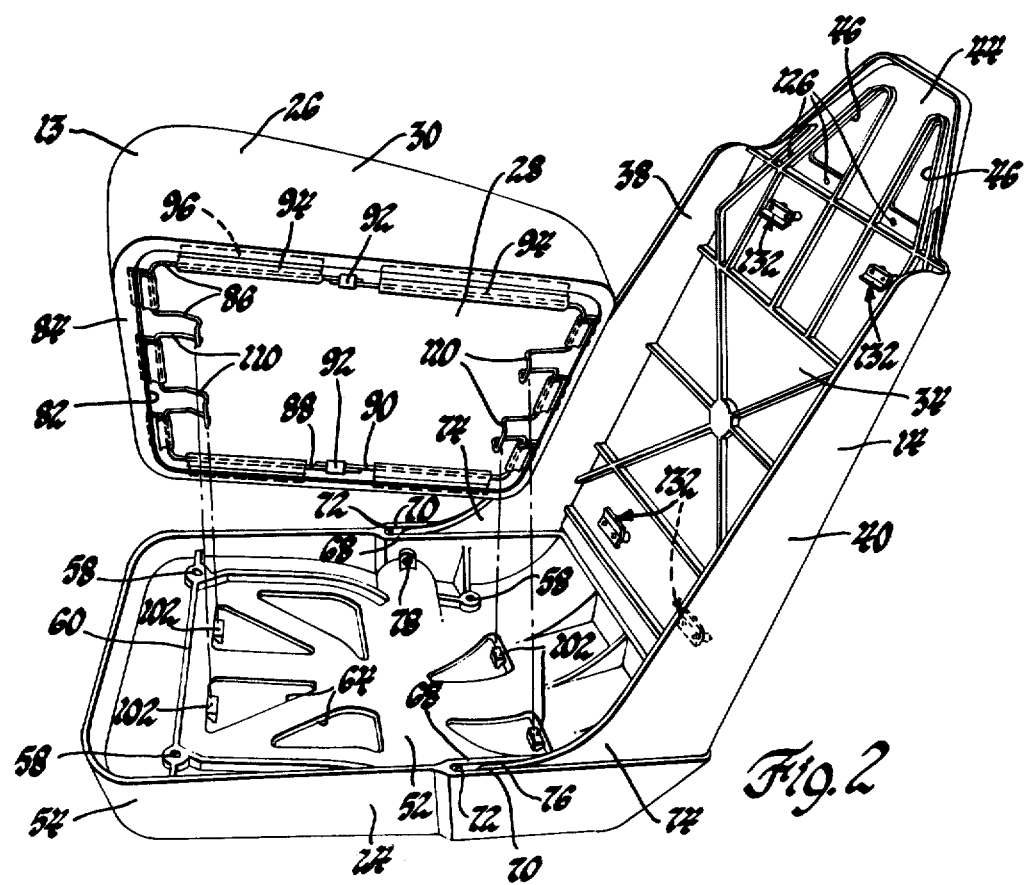

CUSHION RETENTION FOR A VEHICLE SEAT

The invention relates to a vehicle seat and more particularly provides improved retention of a resilient foam cushion bun and a seat cover on a molded plastic seat support.

It is known to provide a seat having a molded plastic support or frame. It is also known to employ a resilient foam cushion bun mounted on a seat cushion support to enhance the comfort of the seated occupant. It is also common practice to cover a foam cushion bun with a vinyl or cloth seat cover.

The present invention provides an improved retention system for mounting a resilient foam seat cushion bun and a seat cover on a molded plastic seat bottom support and seat back support.

According to the invention, the supporting members of a vehicle seat includes a molded plastic seat bottom support member and a molded plastic seat back support member. Cushion members for mounting on the support members include a cushion bun of resilient foam and a seat cover for enveloping the cushion bun. The seat cover has an opening in the underside thereof which permits insertion of the cushion bun when the cushion bun is compressed. A resilient retainer wire extends around the opening and is attached to the seat cover by J-shaped plastic hook strips so that the resilience of the foam bun exerts tension of the retainer wire. The retainer wire has a plurality of abutment structures integral therewith and adapted for mating engagement with corresponding abutments provided on the seat support members when the cushion bun is forcibly stressed to flex the retainer wire. Termination of the stressing effort applied to the cushion allows the resilience of the retainer wire and the tension applied to the seat cover by the compressed cushion bun to maintain the engagement between the retainer wire abutments and the abutments of the support member.

One object, feature and advantage of the invention is the provision of matingly engageable abutments provided respectively on a seat support member and a retainer wire attached to a seat cushion member.

A futher object, feature and advantage of the invention is the provision of J-shaped plastic hooks on the edge of a seat cover at the underside of a seat cushion bun for engagement over a retainer wire attached to a seat support member.

A further object, feature and advantage of the invention is the provision of a system for retaining a resilient foam cushion member on a molded plastic seat support member wherein a resilient retainer wire attached to a seat cover receives tension effort exerted on the seat cover by a resilient foam cushion bun to maintain a mating engagement between mating abutments provided respectively on the retainer wire and the molded plastic support member.

Another object, feature and advantage of the invention is the provision of a seat cushion member wherein a resilient wire is secured to the seat cover at the underface of a cushion bun and is yieldable upon longitudinal compression of the cushion member to perit interengagement of mating abutments provided respectively on the cushion member on a seat support member.

These and other objects, features and advantages of the invention are described in the specification and the appended drawings in which:

FIG. 1 is a perspective view of a vehicle seat in accordance with the invention;

FIG. 2 is an exploded view showing the seat bottom cushion prior to mounting on the seat bottom support;

Figure 3:
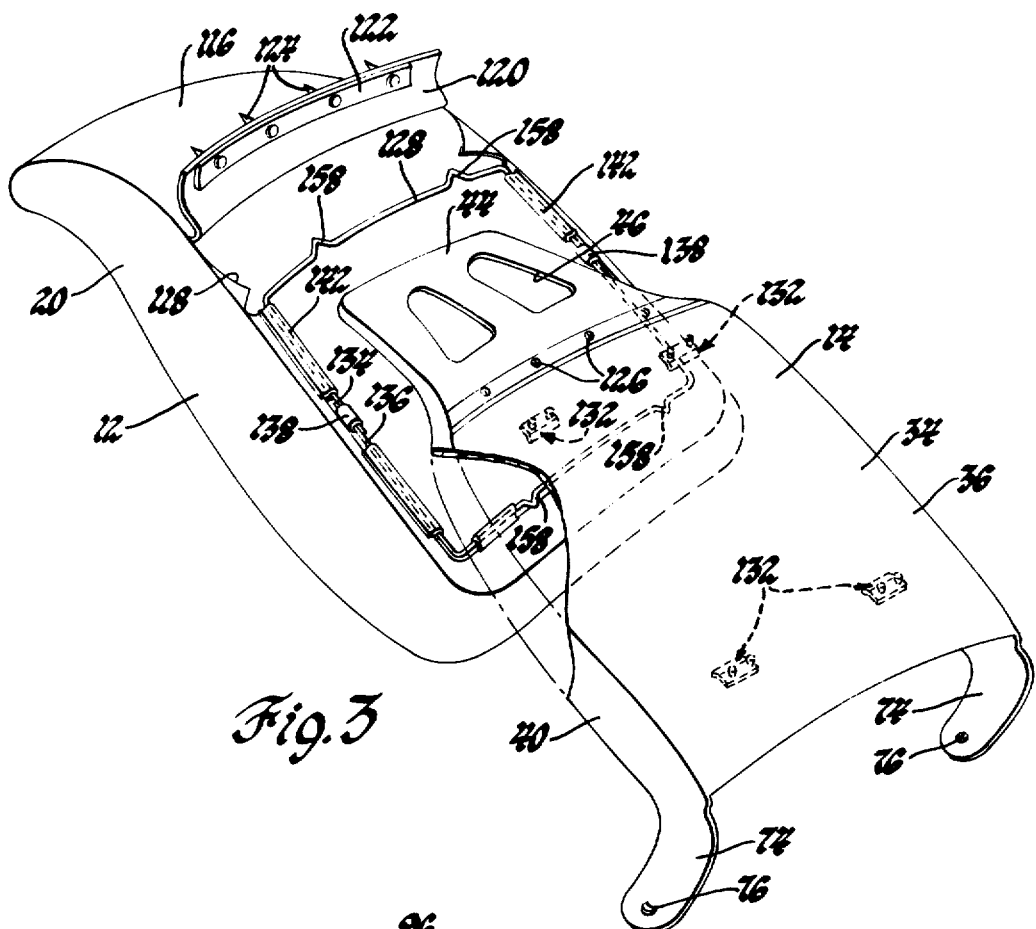
FIG. 3 is an exploded view of the seat back shown prior to mounting of the seat back cushion on the seat back support.

Preferring to FIG. 1, it is seen that a vehicle seat, indicated generally at 10, includes a seat back 12 and a seat bottom 13. The seat back 12 includes a seat back support 14 on which a seat back cushion 16 is mounted. The seat back cushion 16 is comprised of a cushion bun 18 of resilient foam which is enveloped in a vinyl or cloth seat cover 20.

The seat bottom 13 includes a seat bottom support 24 which supports a seat bottom cushion 26. The seat bottom cushion 26 is comprised of a cushion bun 28 of resilient foam and which is enveloped in a vinyl or cloth seat cover 30.

Referring to FIG. 2, it is seen that the seat back support 14 and the seat bottom support 24 are both constructed of an injection molded plastic, preferably a rigid structural foamed plastic. The seat back support 14 includes a generally planar support wall 34 which is adapted to support the seat back cushion 16 against a force applied thereagainst by the seated occupant. As best seen in FIG. 3, the support wall 34 has a decorative surface 36 which faces rearwardly. The seat back support 14 also has sidewalls 38 and 40 which are integrally molded with the support wall 34 at the side edges thereof and extend forwardly and generally perpendicularly therefrom. These sidewalls 38 and 40 contain the edge walls of the seat back cushion 16. The seat back support 14 also has an integrally formed headrest support portion 44 which extends upwardly from the top edge of the support wall 34. The integral headrest support portion 44 may have weight reducing opening 46 formed therein. It will be understood that these weight reducing openings are preferred only in those applications where the seat cover 20 will conceal the presence of the openings from a rear seat occupant.

Referring again to FIG. 2, it is seen that the seat bottom support 24 is constructed in a pan shape with a generally horizontal base wall 52 and a perimeter sidewall 54 which rises generally vertically from the side, front, and rear edges of the base wall 52. The seat bottom support 24 is mounted on the vehicle body by mounting bolts, not shown, which are inserted through holes 58 provided in the base wall 52. The base wall 52 has integrally molded reinforcement bosses 60 which reinforce the base wall 52 and assure proper transference of force loading from the seat bottom support 24 to the mounting bolts and seat adjuster track or floor pan of the vehicle. A plurality of weight saving and material saving openings 64 are provided in the base well 52. The size, number and location of these openings 64 is dependent upon the maintenance of adequate strength of the seat bottom support 24.

As best seen in FIG. 2, the perimeter sidewall 54 includes laterally spaced inner and outer wall portions 68 and 70 at each side which cooperate to define a well or pocket 72. The wells 72 are adapted to receive pivot arms 74 which extend downwardly and forwardly of the seat back support 14 as best seen in FIG. 3. Each of the pivot arms 74 has a pivot aperture 76 which is aligned with a mating aperture formed in the inner wall portion 68 of the seat bottom support 24. Self-tapping pivot bolts 78 are installed through these aligned apertures to effect a pivotal connection of the seat back support 14 on the seat bottom support 24. Accordingly, the seat back 12 can be pivoted forwardly over the seat bottom 13 to facilitate the ingress and egress of an occupant of a seat located rearwardly of the seat 10.

If desired, a seat back latch can be provided between the seat back support 14 and the seat bottom support 24. A seat back latch particularly suited for this application is the subject of copending patent application Ser. No. 553,298 by Arlauskas et al and assigned to the assignee of this invention. It will be understood that there are seating applications in which this pivoting movement of the seat back is not necessary. In those instances the seat back support 14 may be molded integrally with the seat bottom support 24 or may be permanently attached thereto as by bolting.

The seat cover 30 is sewn together prior to being mounted over the cushion bun 28 and has an opening 82 in the underside thereof which is defined by edge portions 84 of the seat cover 30. The cushion bun 28 is compressed sufficiently to permit its insertion through the opening 82 in the seat cover 30. Accordingly, upon termination of such compression, the resilience of the cushion bun 28 expands it toward its natural size which exceeds the size of the seat cover opening 82.

Figure 4:
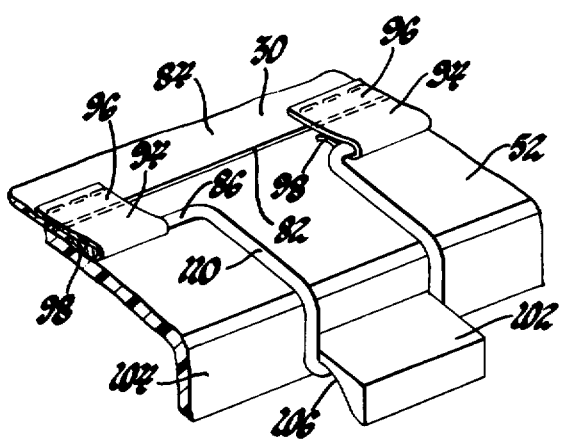
FIG. 4 is a fragmentary cross-sectional view taken through the seat bottom cushion in the direction of arrows 4—4 of FIG. 1.

As best seen in FIG. 2, a retainer wire 86 extends around the edge portion 84 of the seat cover 30. The retainer wire 86 is preferably formed of a forward segment 88 and a rearward segment 90 which are joined by connectors 92. The retainer wire 86 and the seat cover 30 are connected by a plurality of J-shaped extruded plastic strips 94 as best seen in FIG. 4. The plastic strips 94 each have a shank portion 96 which is stitched or otherwise suitably attached to the edge portion 84 of seat cover 30. The plastic strips 94 also have a hook portion 98 which is reversely bent for engagement over the retainer wire 86.

As best seen in FIGS. 2 and 4, a plurality of abutment tabs 102 are formed integrally with the seat bottom support 24 and project laterally from a downwardly depending reinforcing flange 104 of the base wall 52. Each of the abutment tabs 102 has a downwardly opening transversely extending slot 106. As seen in FIGS. 2 and 4, the retainer wire 86 has a plurality of integrally formed inwardly and downwardly extending hook portions 110 corresponding in number to the number of abutment tabs and engageable in the slots 106 of the abutment tabs as best seen in FIG. 4 to attach the seat bottom cushion 26 to the seat bottom support 24.

The hook portions 110 are retained in engagement of the abutment tabs 102 by the resilience of the cushion bun and the resilience of the retainer wire 86. The tension on the seat cover 30 is transferred to the retainer wire 86 by the plastic strips 94. Accordingly, as best seen in FIG. 2, the hook portions 110 on the forward segment 88 of the retainer wire 86 are urged in the forward direction to maintain their engagement over the abutment tabs 102 which are located adjacent the forward end of the seat bottom support 24. Likewise, the hook portions 110 provided in the rearward segment 90 of the retainer wire 86 are urged in the rearward direction and thereby maintained in engagement over the abutment tabs 102 located at the rearward end of the seat bottom support 24.

Assembly of the seat bottom cushion 26 onto the seat bottom support 24 is initiated by lowering the cushion 26 into the seat bottom support 24 and hooking the rearward hook portions 110 of the rearward segment 90 over their mating abutment tabs 102. The cushion 26 is then compressed longitudinally by pushing rearwardly on its forward end. This longitudinal compression results in flexure of the retainer wire 86 so that the hook portions 110 provided in the forward segment 88 can be engaged over their cooperating abutment tabs 102. Relief of the longitudinal compressing force allows the resilience of the cushion bun 28 and the resilience of the retainer wire 86 to maintain the hook portions 110 in engagement of the slots 106 of their respectively associated abutment tabs 102.

Accordingly, longitudinal compression of the cushion bun 28 is required to mount or demount the seat bottom cushion 26 on a seat bottom support 24. The seat bottom cushion 26 can be installed or removed from the support without any tools. This provides an important economy in the assembly of the seat as well as permitting the seat bottom cushion to be easily removed for cleaning or replacement.

Referring to FIGS. 2 and 3, the manner in which the seat back cushion 16 is attached to the seat back support 14 will be described. The seat cover 20 is sewn together prior to being mounted over the cushion bun 18 and has an integral headrest covering portion 116 at the upper end thereof for covering a headrest portion of the cushion bun 18. Seat cover 20 has an opening in the back side thereof which is defined by an edge wall 118. The cushion bun 18 is compressed sufficiently to permit its insertion through the opening defined by an edge wall 118 of the seat cover 20. Then, upon termination of such compression, the resilience of the cushion bun 18 expands it toward its natural size which exceeds the size of the seat cover opening.

Subsequent to the insertion of the cushion bun 18 into the seat cover 20, the seat back cushion 16 is installed over the seat back support 14 as best seen in FIG. 3. The integral headrest support portion 44 of the seat back support 14 is inserted into the seat back cushion 16 between the integral headrest portion of the cushion bun 18 and the integral headrest covering portion 116 of the seat cover 20. A flap portion 120 of the seat cover 20 has a plastic reinforcement strip 122 which carries a plurality of snap-in fasteners 124. The flap portion 120 is folded over to conceal the reinforcement strip 122 and the snap-in fasteners 124 are engaged in a plurality of mating holes 126 provided in the generally planar support wall 34 of the seat back support 14. Accordingly, the headrest portion of the seat back cushion 16 is anchored to the seat back support 14.

The seat back cushion 16 is attached to the seat back support 14 by interengagement between a retainer wire 128 provided on the cushion 16 and a plurality of abutment structure 132 which are provided on the seat back support 14. As best seen in FIG. 3, the retainer wire 128 extends around the edge wall 118 of the seat cover 30. The retainer wire 128 is preferably formed of an upper segment 134 and a lower segment 136 which are joined by connectors 138. The retainer wire 128 and the seat cover 20 are connected by a plurality of J-shaped extruded plastic strips 142, each of which has a shank portion which is sewn or otherwise suitably attached to the edge wall 118 of the seat cover 20 and a hook portion which is reversely bent for engagement over the retainer wire 128.

Figure 5:
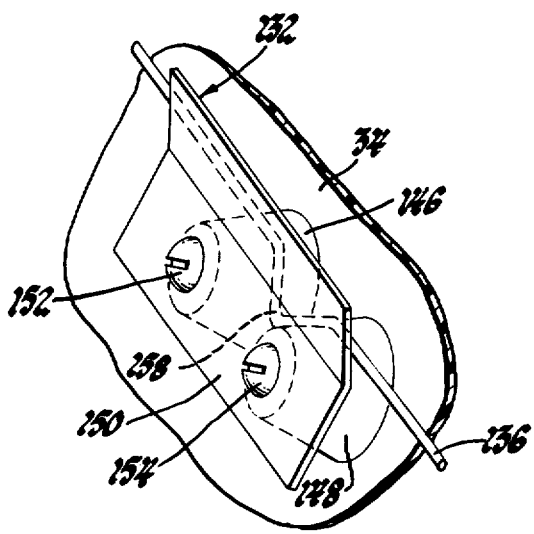
FIG. 5 is an enlarged fragmentary view of the seat back support.

As best seen in FIGS. 3 and 5, the abutment structures 132 include a pair of truncated conical projections 146 and 148 which project forwardly from the support wall 34 of seat back support 14 and are laterally spaced from one another. A bar 150, preferably a sheet metal stamping, connects the distal ends of the projections 146 and 148 and is attached thereto by self-tapping screws 152 and 154. Accordingly, the projections 146 and 148 space the bar 150 from the seat back support wall 34. Alternatively, the projections 146 and 148 and the bar 150 may be integrally molded with the seat back support 14.

Referring again to FIG. 3, it is seen that generally V-shaped abutments 158 are provided on the retainer wire 128 at locations corresponding to the locations of the abutment structures 132 of the seat back support 14. As best seen in FIG. 3, the abutments 158 on the lower retainer wire segment 136 are downwardly directed while the abutments 158 and the upper segment 134 are directed upwardly. As best seen in FIG. 5, the downwardly directed abutments 158 of the lower segment 136 are engaged in the opening defined between the support wall 34, the projections 146 and 148, and the bar 150 of the abutment structure 132. This interengagement is effected by compressing the cushion 26 longitudinally to flex the retainer wire so that the abutments 158 become engaged within their respective mating abutment structures 132. Relief of the longitudinal compressing force allows the resilience of the cushion bun and the resilience of the retainer wire 128 to maintain the abutments 158 engaged within the abutment structures 132.

Thus, it is seen that the invention provides improved retention of resilient cushion bun and seat cover on a molded plastic seat support frame by the interengagement between abutments provided on a retainer wire affixed to the seat cover and mating abutment members provided in the molded plastic seat support frame. Furthermore, the improved retention system of this invention may be used to retain a cushion bun and seat cover on a stamped sheet metal frame or a welded tubular frame.

The embodiments of the invention in which an exclusive property or privilege is claimed are defined as follows:

1. A vehicle seat comprising:
a support member having a generally planar support wall;
a seat cushion for mounting on the support member in engagement with the support wall of the support member, said seat cushion having a cushion bun of resilient foam for comfortably seating an occupant on the support member and a seat cover enveloping the cushion bun, the seat cover having an edge portion and an opening adjacent the edge portion through which the cushion bun may be inserted by compressing the cushion bun and then allowing expansion of the cushion bun to fill the seat cover;
a resilient retainer wire extending around the opening and being attached along the edge portion of the seat cover so that the resilience of the foam bun urges the seat cover outwardly in the direction enlarging the opening and exerting tension on the retainer wire;
a plurality of abutment means on the support member and a plurality of cooperable abutment means formed integrally in the retainer wire, the respective abutment means being matingly engageable upon flexure of the retainer wire in the direction which decreases the size of the opening of the seat cover and opposes the tensioning effort exerted on the border wire by the resilience of the cushion bun acting on the seat cover whereby the resilience of the cushion bun cooperates with the resilience of the retainer wire to maintain the integrally formed abutment means on the retainer wire in engagement with the mating abutment means on the support member to attach the seat cushion on the support member.

2. A vehicle seat comprising:
a support member having a generally planar support wall;
a cushion bun of resilient foam for mounting on the support wall of the support member to comfortably seat an occupant on the support member;
a seat cover for enveloping the cushion bun and having an edge portion and an opening defined by the edge portions of the seat cover;
a J-shaped extruded plastic strip having a shank portion and a hook portion, the shank portion being attached along the edge portion of the seat cover;
a flexible retainer wire extending along at least a portion of the edge portion of the seat cover around the opening and being inserted in the J-shaped hook strip, the resilience of the foam bun urging the seat cover outwardly in the direction enlarging the opening so that the retainer wire is captured in the hook portion of the J-shaped strip;
and attaching means acting between the support member and the retainer wire at spaced intervals along the retainer wire, the resilience of the cushion bun cooperating with the resilience of the retainer wire to maintain tension on the attaching means acting between the support member and the retainer wire.

3. A vehicle seat comprising: a seat support member having a generally planar support wall; a cushion bun of resilient foam for mounting on the support wall; a seat cover enveloping the cushion bun and having an edge portion defining an opening therein through which the cushion bun is inserted by compressing the cushion bun and then allowing expansion of the cushion bun to fill the seat cover; J-shaped hook means having a shank portion attached along the edge portion of the seat cover and a hook portion extending into the opening; a flexible retainer wire extending around the edge portion of the seat cover and being engaged by the hook of the J-shaped hook means, the resilience of the foam bun urging the seat cover outwardly in the direction enlarging the opening so that the retainer wire is maintained in captured engagement of the hook portion of the hook means; a plurality of abutment means formed integrally with the retainer wire; and a pluraity of abutment means carried by the support member and being matingly engageable by the abutment means of the retainer wire to attach the seat cushion on the support member.

* * * * *